US006752379B1

(12) United States Patent
Wall (10) Patent No.: US 6,752,379 B1
(45) Date of Patent: Jun. 22, 2004

(54) ADJUSTABLE TOILET DOLLY

(76) Inventor: Richard L. Wall, 415 N. Winter St., River Falls, WI (US) 54022

( * ) Notice: Subject to any disclaimer, the term of this patent is extended or adjusted under 35 U.S.C. 154(b) by 17 days.

(21) Appl. No.: 10/438,717

(22) Filed: May 16, 2003

(51) Int. Cl.$^7$ .................................................. B60P 1/10
(52) U.S. Cl. ..................................... 254/7 R; 254/134
(58) Field of Search .................... 414/10, 495; 254/2 R, 254/2 B, 4 R, 4 B, 6 R, 6 B, 7 R, 7 B, 45, 133, 134; 269/17, 296, 71

(56) References Cited

U.S. PATENT DOCUMENTS

| | | | | |
|---|---|---|---|---|
| 3,262,590 A | * | 7/1966 | Lynn | |
| 3,391,905 A | * | 7/1968 | Burns | |
| 4,183,511 A | * | 1/1980 | Marek | 269/17 |
| 4,722,511 A | * | 2/1988 | Chitwood | |
| 5,184,653 A | * | 2/1993 | Lacy | |
| 5,203,065 A | * | 4/1993 | Peters | |
| 5,373,593 A | * | 12/1994 | Decky et al. | |
| 5,505,430 A | * | 4/1996 | Barnett | 254/2 R |
| 5,556,076 A | * | 9/1996 | Jacquay | |
| 5,619,762 A | * | 4/1997 | Mein | 5/86.1 |
| 5,716,183 A | * | 2/1998 | Gibson et al. | 414/451 |
| 5,897,101 A | * | 4/1999 | Snyder | 254/8 B |
| 6,015,137 A | * | 1/2000 | Guevara et al. | |
| 6,135,466 A | * | 10/2000 | Irwin | 280/47.28 |

* cited by examiner

Primary Examiner—Joseph J. Hail, III
Assistant Examiner—Daniel Shanley
(74) Attorney, Agent, or Firm—John D. Gugliotta; Olen L. York, III (57) ABSTRACT

A toilet dolly is a "U"-shaped frame that slide around either side of the toilet bowl. The frame comprises two arms that are adjustable to fit any size bowl or any difficult installation and are connected to a cross-arm. Padded lifting arms are provided to lock in place around the bowl. The two toilet mounting nuts removed, a series of three jack screws are raised in an alternating fashion to allow the bowl assembly to clear the floor-mounted fastening bolts. Once clear, the bowl can be rolled out of the bathroom. The bowl can be reinstalled by a similar but reverse process. The actually raising of the jack screw can be accomplished with an electrical drill, including cordless drills, and/or a ratchet.

9 Claims, 6 Drawing Sheets

Fig. 8

ADJUSTABLE TOILET DOLLY

RELATED APPLICATIONS

The present invention was first described in Disclosure Document Registration 488,437 filed on Feb. 9, 2001 under 35 U.S.C. §122, 37 C.F.R. §1.14 and MPEP §1706. There are no previously filed, nor currently any co-pending applications, anywhere in the world.

BACKGROUND OF THE INVENTION

1. Field of the Invention

The present invention relates generally to transportation hand carts and, more particularly, to an adjustable transportation hand cart specifically adapted for raising, maneuvering and reinstalling a toilet.

2. Description of the Related Art

As anyone who performs a lot of physical work will attest, nothing beats having the proper tool for a job. The proper tool can save time, save money, produce a higher quality job, reduce damage to equipment, and provide for the increased safety of the worker. A prime example of this philosophy is evident in the task of removing and reinstalling toilets when a new floor covering is to be installed. The usual procedure is to disconnect the water supply and remove the bolts from the floor, and then lifting the toilet bowl up and out of the way. Next each individual piece must be manhandled to remove it. This of course takes extra time, places undue stress on strain on one's muscles and back, and may lead to possible damage to the fixture itself should it be dropped.

A search of the prior art did not disclose any patents that read directly on the claims of the instant invention; however, the following references were considered related.

U.S. Pat. No. 3,262,590, issued in the name of Lynn, discloses a lifting device for raising and lowering plumbing fixtures, said device comprising spaced legs straddling the plumbing fixture and a suspended jack mechanism for aiding in lifting and suspension of the plumbing fixture;

U.S. Pat. No. 3,391,905, issued in the name of Burns, discloses a toilet bowl handling and transporting apparatus comprising a U-shaped base frame with casters, an elevating jack mounted to the frame, a releasable connection between the base frame and jack, a carrying boom, a clamping assembly and a movable clamping assembly adjustably mounted to slide along the carrying boom;

U.S. Pat. No. 4,722,511, issued in the name of Chitwood, discloses a toilet lift truck comprising a wheeled frame with a pair of moveable lifting bars attached thereto;

U.S. Pat. No. 5,184,653, issued in the name of Lacy, discloses a toilet dolly comprising a hollow body containing a water reservoir, the body having a top panel with a toilet mount, a bottom panel with locking casters, a carrying handle and a drain;

U.S. Pat. No. 5,203,065, issued in the name of Peters, discloses a toilet fixture installation apparatus comprising a three-wheeled base structure having a pair of lower frame members connected by a crossmember and defining a base plane, a fixed vertical mast carrying a sliding mast elevated by a jack member, a fixed horizontal boom, a fixed shoe and an adjustable shoe;

U.S. Pat. No. 5,373,593, issued in the name of Decky et al., discloses a hand cart for lifting and transporting toilets comprising a whelled base and frame designed to straddle a toilet and a hand operated a jack and ball engaging grapples;

U.S. Pat. No. 5,556,076, issued in the name of Jacquay, discloses a toilet lifting and transporting device comprising hollow steel tubing bent to define a U-shaped base frame and having a pair of support legs extending upwardly from the base frame and a cross member interconnecting the top ends of the support legs; and U.S. Pat. No. 6,015,137, issued in the name of Guevara et al., discloses an apparatus for suspending and transporting toilets with a wheeled C-shape assembly that has a hoist assembly mounted thereto.

Consequently, there exists a need for a means by which toilets can be easily removed and reinstalled without the inherent disadvantages as described above.

SUMMARY OF THE INVENTION

It is therefore an object of the present invention to provide an improved transportation hand cart.

It is a feature of the present invention to provide an improved adjustable transportation hand cart specifically adapted for maneuvering a toilet.

Briefly described according to one embodiment of the present invention, a toilet dolly is a "U"-shaped frame that slide around either side of the toilet bowl. The frame comprises two arms that are adjustable to fit any size bowl or any difficult installation and are connected to a cross-arm. Padded lifting arms are provided to lock in place around the bowl. The two toilet mounting nuts removed, a series of three jack screws are raised in an alternating fashion to allow the bowl assembly to clear the floor-mounted fastening bolts. Once clear, the bowl can be rolled out of the bathroom. The bowl can be reinstalled by a similar but reverse process. The actually raising of the jack screw can be accomplished with an electrical drill, including cordless drills, and/or a ratchet.

The use of the adjustable toilet dolly allows for the quick removal and reinstallation of just about any type of toilet bowl in a manner which is not only quick, easy and effective, but safe for both the user and the toilet bowl as well.

An advantage of the present invention is that it aid in lifting the toilet bowl and tank together from the underside of the rim of the stool.

Another advantage of the present invention is that it does not rely on physical strength of the user, thereby being safer, eliminating muscle strain and preventing back injuries.

Further, use of the present invention is less likely chance of damage to fixture, helping reduce the potential expense of the removal and reinstallation project.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the FIGS. 1–8.

Detailed Description of the Figures

Figure 1:
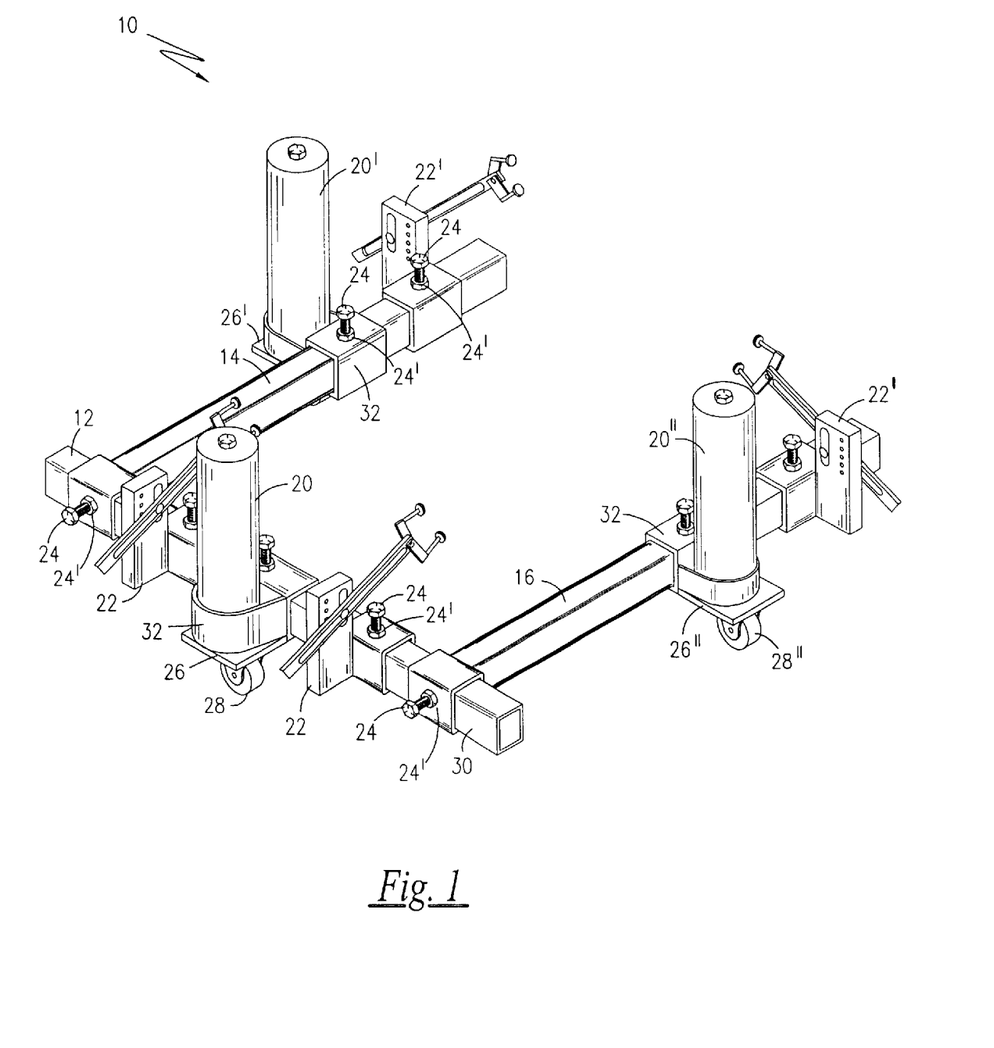
FIG. 1 is a perspective view of the adjustable toilet dolly viewed from the right side of the closed end of the apparatus.
Figure 2:
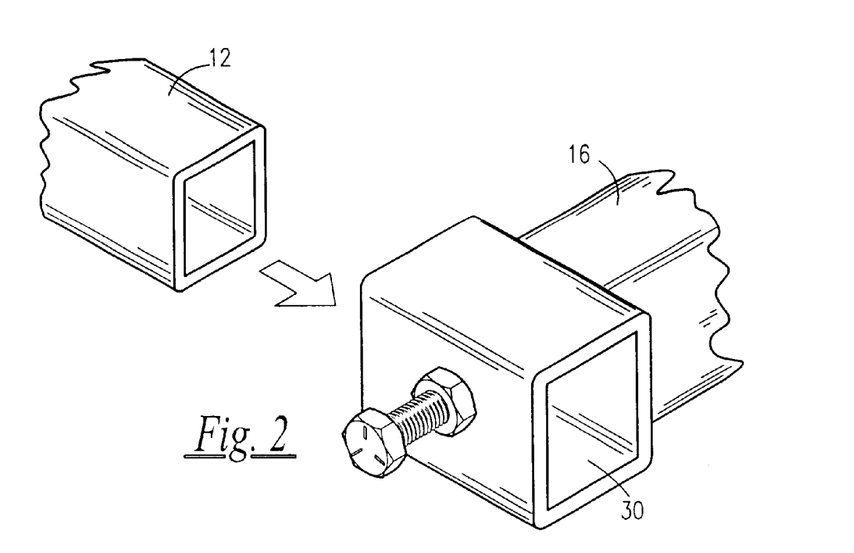
FIG. 2 is a partial tear-away view of a cross arm member detached from an adjustable arm member, illustrating the central arm opening of the adjustable arm member.

Referring now to FIG. 1, an adjustable toilet dolly 10 is shown, according to the present invention, from an exploded perspective view comprising a linearly elongated cross-arm member 12 and two oppositely positioned and linearly elongated adjustable arm members 14 and 16 slidably affixed or attached to the cross-arm member 12. The respective arm members 12, 14 and 16 form a substantially U-shaped apparatus, as is evident from FIG. 1. The cross-arm member 12 includes a mechanical screw jack cavity 46 (not shown here, see FIG. 3 and FIG. 4) and receives an adjustable mechanical screw jack 20. The mechanical screw jack 20 is envisioned as having an exterior cylinder and an interior cylinder, said exterior cylinder and said interior cylinder telescoping about one another when the mechanical screw jack 20 is manipulated for raising and lowering of said dolly. The cross-arm member 12 also includes two sliding and adjustable lifting arm assemblies 22 positioned on either side of the adjustable mechanical screw jack 20 and capable of adjustment by a threadable machine bolt 24 (so as to permit adjustment of bolt 24 via a mechanical socket). The adjustable mechanical screw jack 20 rests on a flat cylinder tray 26 and is supported by a caster wheel 28.

Figure 4:
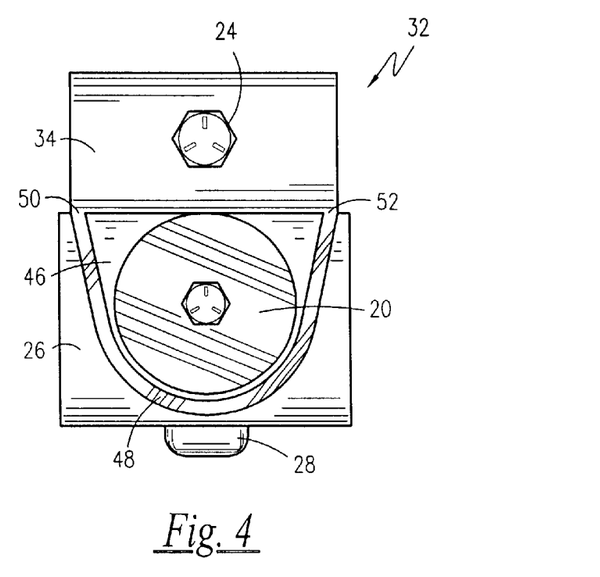
FIG. 4 is a top view of an adjustable mechanical screw jack assembly.
Figure 5:
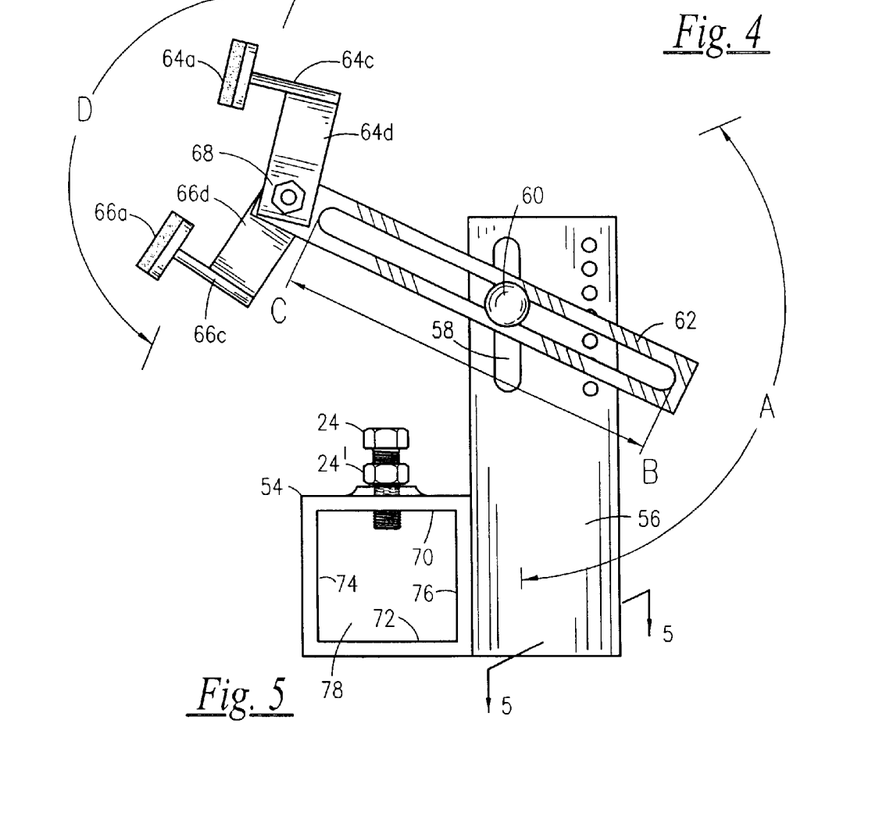
FIG. 5 is a side view of an adjustable lifting arm assembly.
Figure 6:
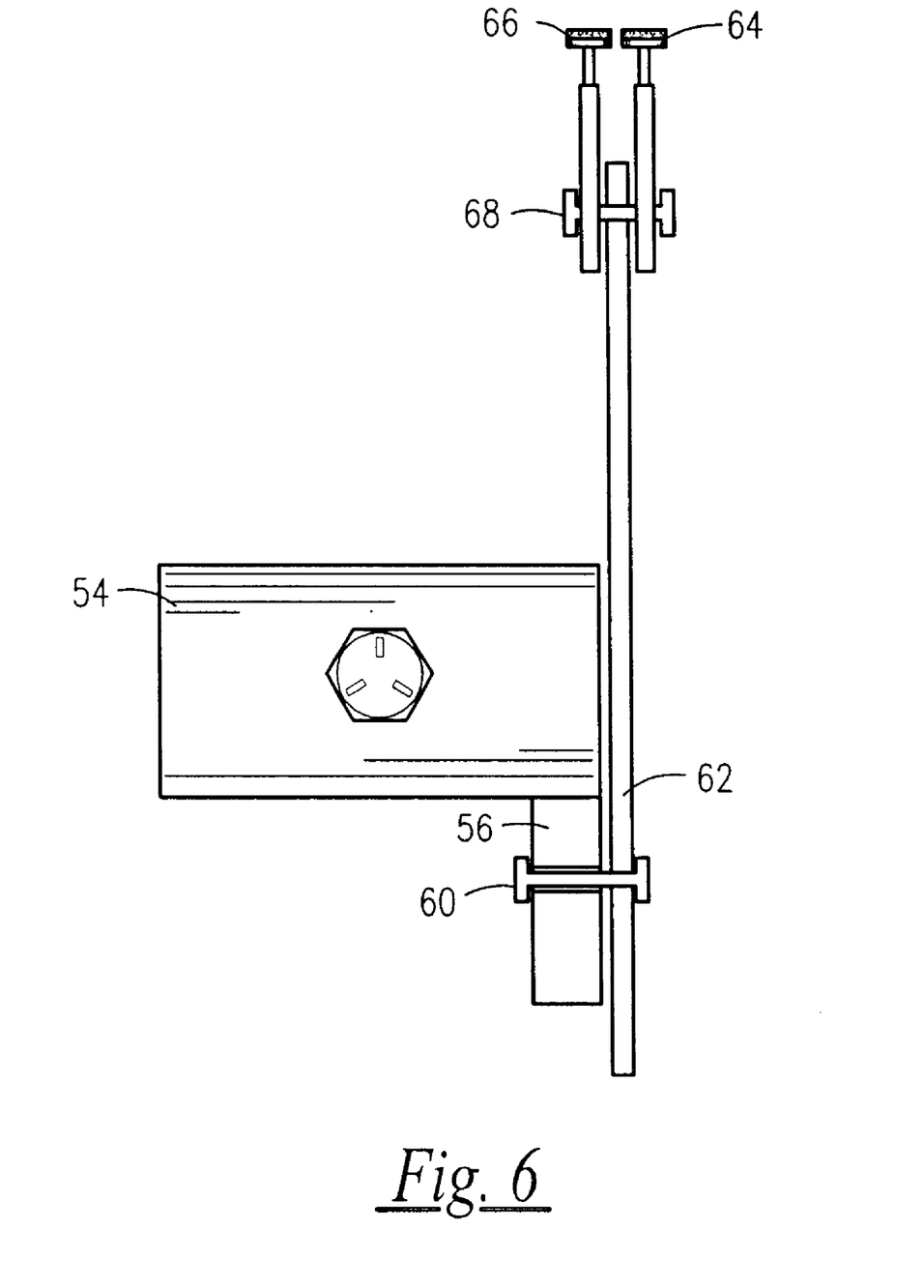
FIG. 6 is a top view of an adjustable lifting arm assembly taken through the line 5—5.

The adjustable arm members 14 and 16 each include a cross-arm opening 30 (see FIG. 2), a mechanical cylinder jack cavity 46 (see FIG. 3 and FIG. 4), and a sliding and adjustable lifting arm assembly 22 (see FIG. 1, FIG. 5 and FIG. 6). The mechanical cylinder jack cavity 46 receives an adjustable mechanical screw jack 20 and sets on a flat cylinder tray 26 supported by a caster wheel 28. The sliding and adjustable lifting arm assembly 22' are adjusted along the arm members 14 or 16 by a threadable machine bolt 24. The cross arm opening 30 is slidably attached to the cross-arm member 12 and is set in a fixed position by a threadable machine bolt 24. The threaded machine bolt 24 may insert through a nut welded 24' to the outside of the aperture that receives the machine bolt 24, or through a threaded aperture intended to receive the machine bolt 24.

Figure 3:
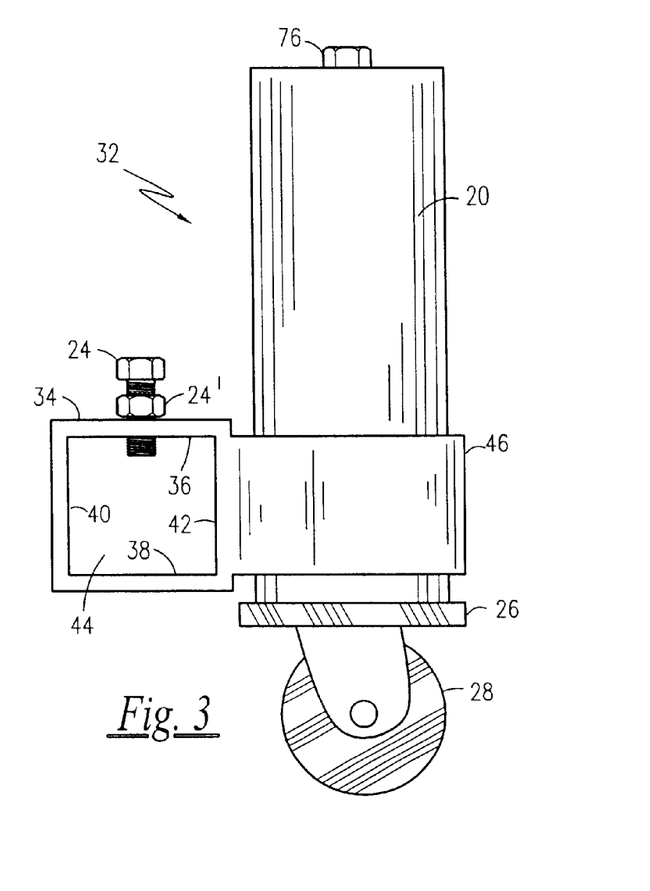
FIG. 3 is a side view of an adjustable mechanical screw jack assembly.

Referring now to FIG. 3 and FIG. 4, a side view and a top view, respectively, illustrate an adjustable mechanical cylinder jack assembly 32 comprising a clamp means opening 44, with a threadable machine bolt 24. A top wall 36 positioned opposite to a lower wall 38 and a front wall 40 positioned opposite a rear wall 42, in which said top wall 36 perpendicularly depends from the front and rear walls 40 and 42 on one end, and in which said lower wall 38 perpendicularly depends from the front and rear walls 40 and 42 on the opposite end, form a clamp means opening 44 which is capable of receiving the cross arm member 12 or an adjustable arm member 14 or 16. A threadable machine bolt 24 allows a user to tighten or loosen the positioning of the clamping means 34 and slidably adjust the mechanical jack clamping means 34 along a specified length of the respective arm members 12 or 14 or 16, the specified length generally including from the end terminating with the cross-arm opening 30 on either of the pair of adjustable arm members 14 or 16 and along a length to the positioning of an lifting arm assembly 22.

A mechanical screw jack cavity 46, formed by a bracing member 48 extending from a contact point 50 to another contact point 52 of the rear wall 42. The mechanical screw jack cavity 46 receives a mechanical screw jack 20, with the mechanical screw jack 20 setting on a cylinder tray 26 and further supported by a caster wheel 28. It is also envisioned that the bracing member 48 may be welded directly to the screw jack 20, and the screw jack 20 may be welded directly to the jack assembly 32 to eliminate the number of independently moveable parts.

Referring now to FIG. 5 and FIG. 6, a side view and partial sectional view, respectively, illustrates a sliding and adjustable lifting arm assembly 22 or 22' comprising a rectangular assembly clamping means 54, with a threadable machine bolt 24, fixedly attached to the lower portion of a rear brace 56. The upper portion of the rear brace 56 houses an elongated opening 58 through which a carriage bolt 60 may be inserted to couple the rear brace 56 to an adjustable bracket 62, the adjustable bracket 62 having a corresponding elongated slot through which the carriage bolt 60 may be inserted, and in which the adjustable bracket 62 may be positioned along the angle A or slidably adjusted along the line B to C. At one end of the adjustable bracket 62 a pair of vertically opposed padded members 64 and 66 are attached to the adjustable bracket 62 by a hinging means 68 which may be adjusted to position the vertically opposed and rotatably adjustable padded members 64 and 66 along the angle D. The rotatable adjustability of the members 64 and 66 is further discussed below. The hanging means 68 is envisioned as a bolt having dual threads, one set of threads about one end and another set of threads about the opposite end. The hanging means 68 (bolt) is envisioned as being welded to the bracket 62 so that each threaded end is exposed but secured in a rigid and stationary position. The dual threaded bolt permits the pair of padded members 64 and 66 to be independently adjusted, with a nut securing each of the members 64 and 66 to the hanging means 68 (bolt).

A top wall 70 positioned opposite to a lower wall 72 and a front wall 74 positioned opposite a rear wall 76, in which said top wall 70 is perpendicularly attached to the front and rear walls 74 and 76 on one end, and in which said lower wall 72 is perpendicularly attached to the front and rear walls 74 and 76 on the other end, form a clamp means opening 78 which is capable of receiving the cross-arm member 12 or an adjustable arm member 14 or 16. A threadable machine bolt 24 allows a user to tighten or loosen the positioning of the assembly clamping means 54 and slidably adjust the assembly clamping means 54 along a specified length of the respective arm members 12 or 14 or 16.

Figure 7:
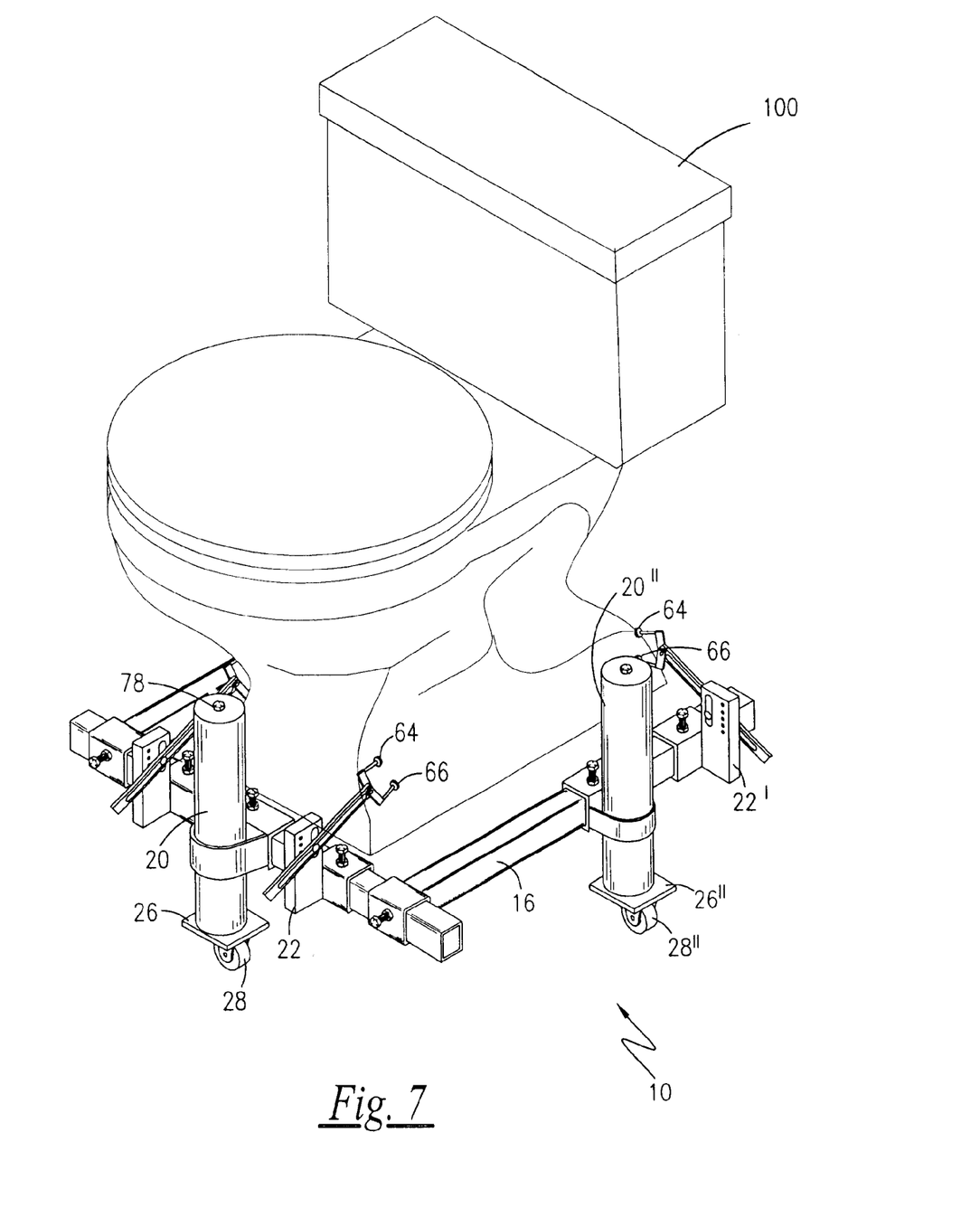
FIG. 7 is a perspective view of the apparatus of FIG. 1 positioned to transport a toilet to another area.

Referring now to FIG. 7, the adjustable toilet dolly 10 is shown in relation to a toilet. The adjustable arms 14 (not shown here) and 16 are adjusted to fit along the side of the toilet 100. The adjustable lifting arm assemblies 22 or 22' are positioned so that the padded members 64 and 66 are against the outside of the toilet 100 to provide stability as the toilet 100 is lifted or transported from its current location. A cylinder-jack nut 80 is turned, by wrench, drill or other suitable means, to raise or lower the mechanical screw jack 20. Once the toilet 100 is lifted sufficiently high enough from the ground, the caster wheels 28 provide a means for conveniently transporting the toilet 100.

Figure 8:
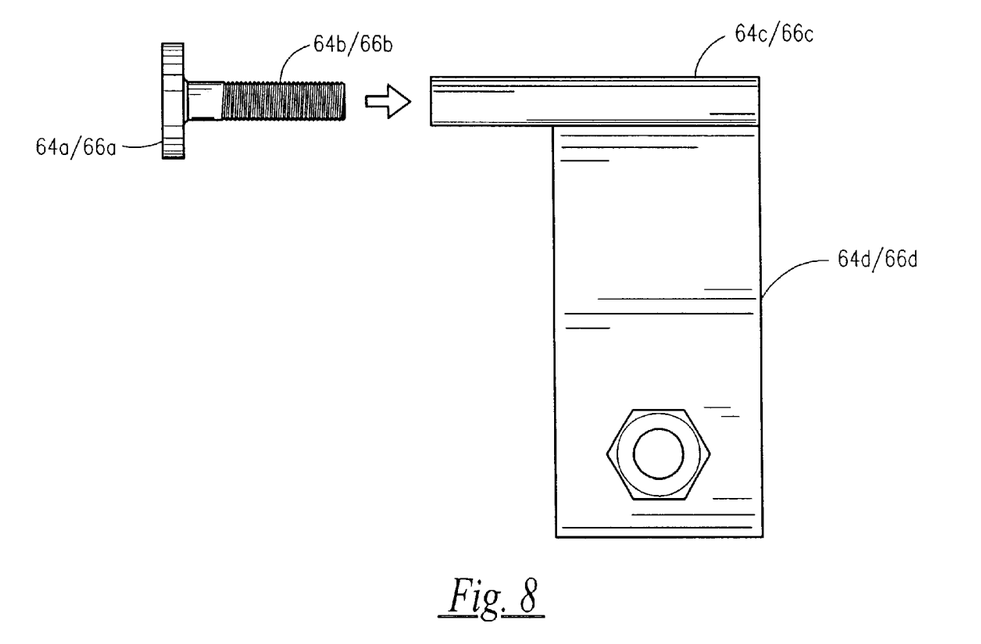
FIG. 8 is a side view illustrating one of the padded members and the insertion and threadable hand adjustment of a stem into a stem housing at the end of a panel.

Referring now to FIG. 8, one of the padded members 64 or 66 is illustrated in an exploded view to expose the components of the members 64 or 66. The actual padded feet 64a or 66a are affixed at the end of a linearly elongated and threaded stem 64b or 66b, wherein the padded feet 64a and 66a are pivotal about the stems 64b or 66b. The stem 64b or 66b is threadably inserted into a stem housing 64c or 66c, wherein the stem housing 64c or 66c is integral or affixed to a planar panel 64d or 66d. The planar panel 64d or 66d includes an aperture through which the hanging means 68 (bolt) is inserted.

The caster wheels 28 may have a variety of configurations, including the bushing-style of bearing most commonly known used in caster wheels. However, it is envisioned that the caster wheels 28 of the present invention may include ball-bearings, which will provide a smoother transportability of the dolly 10, and may extend the life of the caster wheels 28. Also, the caster wheels 28 may be equipped with a locking mechanism that prevents unnecessary rolling or swiveling of the wheels 28. The locking mechanism is envisioned as being of the finger-operated type that is easily and efficiently locked and unlocked by a user.

Operation of the Preferred Embodiment

An assembled adjustable toilet dolly 10 is placed into a position such that the adjustable arms 14 and 16 lie substantially parallel to the side of the toilet 100. The adjustable arms 14 and 16 are slidably positioned facilitated by the caster wheels 28. If the width of the adjustable arms 14 and 16 must be adjusted, a user can loosen the respective threaded machine bolt 24' of the adjustable arms 14 and 16, which are then capable of sliding horizontally along the cross-arm member 12. When the adjustable arms 14 and 16 are in the desired position, the user will tighten the respective threaded machine bolt 24'.

Once the adjustable arms 14 and 16 are in the desired position, the sliding and adjustable lifting arm assemblies 22 and 22' of the adjustable arms 14 and 16 and of the cross-arm member 12 are adjusted to firmly position the padded members 64 and 66 against the outside of the toilet 100, so positioned to forcibly impinge and suspend the toilet 100 between the positioned lifting arm assemblies 22 and 22' as the toilet dolly 10 is vertically raised by the screw jacks 20. The entire sliding and adjustable lifting arm assembly(ies) 22 or 22' may be slidably adjusted by loosening the corresponding threaded machine bolt 24 and sliding the sliding and adjustable lifting arm assembly 22 or 22' horizontally along the corresponding adjustable arm 14 or 16. Additionally, the length or angle of the adjustable bracket 62 may be adjusted by loosening the carriage bolt 60 that couples the adjustable bracket 62 to the rear brace 56 and placing the adjustable bracket 62 in the desired position. Further flexibility is provided by the adjustable padded members 64 and 66, which may be adjusted by loosening the nut 68 that couples the vertically opposed padded members 64 and 66.

After the sliding and adjustable lifting arm assemblies 22 and 22' are in the desired position, a wrench or other suitable device is used to turn the corresponding cylinder-jack nut 80 to raise or lower the corresponding mechanical screw jack 20. After the three mechanical screw jacks 20 are raised to a sufficient floor height, the user may push the adjustable toilet dolly 10 to another desired location, facilitated by the caster wheels 28.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. A toilet dolly comprising:
    a linearly elongated cross-arm member;
    a pair of linearly elongated, adjustable arm members, each of said pair of arm members slidably affixed to said cross-arm member via a cross-arm opening;
    said cross-arm member and said pair of arm members forming a substantially U-shaped apparatus;
    a plurality of mechanical screw jacks affixed to said dolly for raising and lowering said dolly;
    a plurality of adjustable lifting arm assemblies arranged about said cross-arm member and said pair of arm members, said plurality of adjustable lifting arm assemblies positioned against a toilet to securely and suspendingly impinge said toilet within said dolly; and
    a plurality of caster wheels for maneuvering said dolly.

2. The toilet dolly of claim 1, wherein each of said pair of arm members is impinged by a threaded machine bolt threadably inserted into said cross-arm opening and impinging against said cross-arm member.

3. The toilet dolly of claim 2, wherein said machine bolts are threadably inserted into said cross-arm member via a threaded nut welded to said cross-arm opening.

4. The toilet dolly of claim 1, wherein each of said plurality of mechanical screw jacks comprise an exterior cylinder and an interior cylinder, said exterior cylinder and said interior cylinder maintaining a telescopic relationship to one another when manipulated for raising and lowering of said dolly.

5. The toilet dolly of claim 4, wherein each of said plurality of mechanical screw jacks is manipulated by a machine bolt in the top of said jacks.

6. The toilet dolly of claim 1, wherein said plurality of adjustable lifting arm assemblies comprise:
    rectangular assembly clamping means, said assembly clamping means slidably affixed to said cross-arm member and said adjustable arm members via clamp means opening;
    a rear brace affixed at a rear of said assembly clamping means;
    an adjustable bracket affixed to said rear brace via a carriage bolt inserted through an elongated opening formed in an upper portion of said rear brace and an elongated slot formed in said adjustable bracket; and
    a pair of vertically opposed padded members attached to said adjustable bracket via hanging means, said hanging means may be adjusted to position the vertically opposed and rotatably adjustable padded members in a position appropriate for abutment against said toilet.

7. The toilet dolly of claim 6, wherein each of said pair or vertically opposed padded members comprise:
    a planar panel;

a stem housing formed at a terminal end of said planar panel, said stem housing comprising internal threads;

a stem comprising external threads for threadably inserting into said stem housing; and a padded foot affixed to a terminal end of said stem, said padded foot pivotal about said stem.

8. The toilet dolly of claim 7, wherein each of said pair of vertically opposed padded members are coupled via alignment of apertures formed in each of said panels, wherein said hanging means is inserted through said apertures.

9. The toilet dolly of claim 1 further comprising a plurality of flat cylinder trays, each of said flat cylinder trays supporting a respective said plurality of mechanical screw jacks, each of said flat cylinder trays affixed to one of said plurality of caster wheels.

* * * * *